June 1, 1948. J. R. MILLER 2,442,504
VISORED ANTIGLARE REAR VIEW MIRROR FOR VEHICLES
Filed April 6, 1946
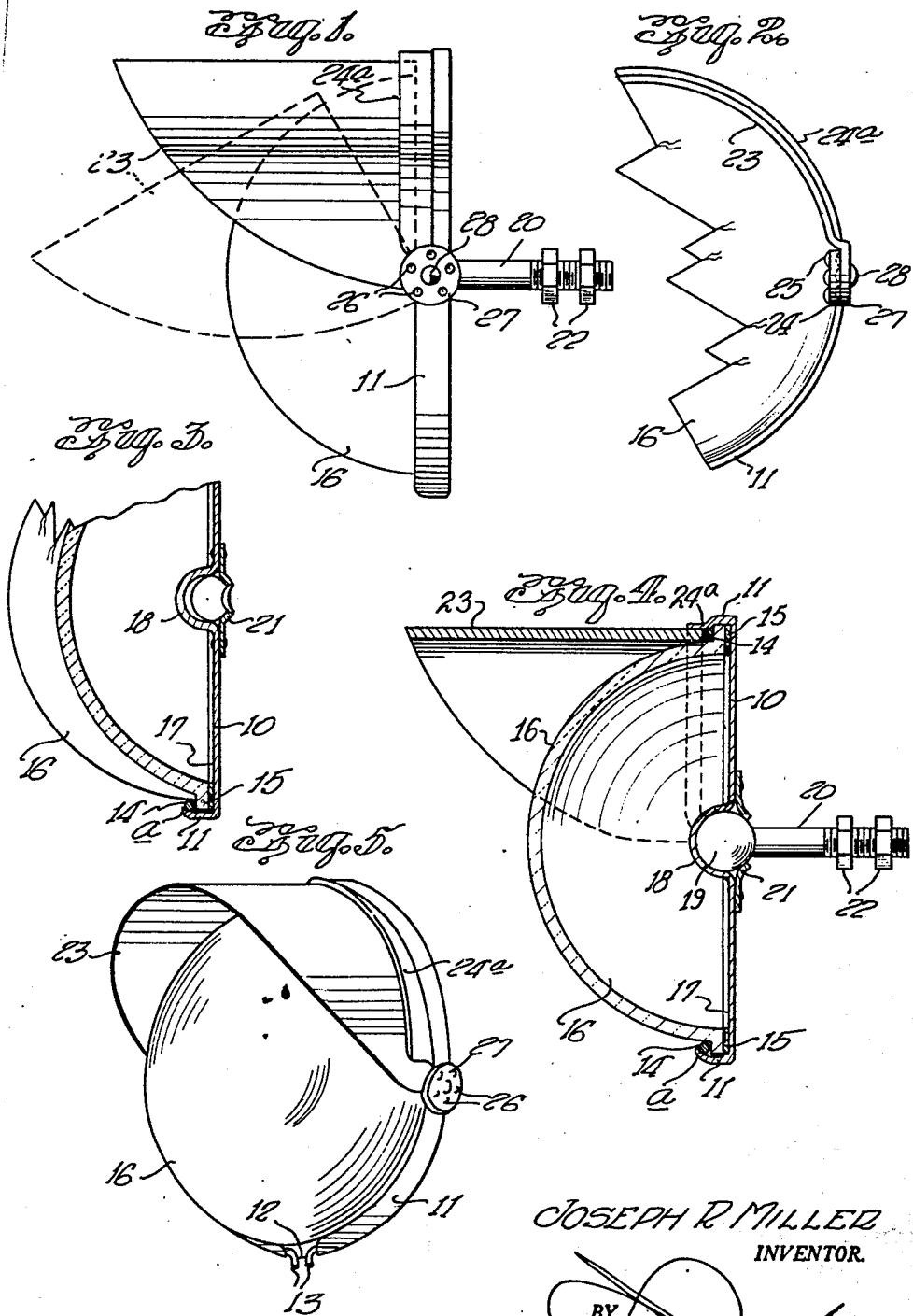
JOSEPH R MILLER
INVENTOR.
BY
ATTORNEY Patented June 1, 1948

2,442,504

UNITED STATES PATENT OFFICE 2,442,504

VISORED ANTIGLARE REARVIEW MIRROR FOR VEHICLES

Joseph R. Miller, Calvert, Tex.

Application April 6, 1946, Serial No. 660,066

2 Claims. (Cl. 88—98)

This invention relates to rear view mirrors for vehicles and more particularly to visored mirrors of this type.

The principal object of the invention is to provide a rear view mirror which is especially useful for drivers of truck-trailers for the reason that the reflecting surface is hemispherical and hence vision is widely extended. Moreover, provision is made through the medium of an arcuate visor pivoted to the mirror frame to enable the driver to quickly and conveniently adjust the same to prevent reflection of objectionable rays from the sun and, in some cases the glare of headlights of vehicles approaching from the rear.

Still another object of the invention is to provide a rear view mirror of hemispherical shape which is readily mountable in and removable from its mounting but when mounted, the interior of the mirror is sealed against ingress of dirt and moisture which would have damaging effects upon the mirrored surface.

With the foregoing objects as paramount, the invention has further reference to certain features of accomplishment which will become apparent as the description proceeds, taken in connection with the accompanying drawing wherein:

Figure 1 is a side elevational view of a rear view mirror constructed according to the present invention.

Figure 2 is a fragmentary front elevational view thereof.

Figure 3 is a fragmentary view in vertical section.

Figure 4 is a view similar to Figure 3 but showing the mounting rod attached, and Figure 5 is a front perspective view.

Continuing with a more detailed description of the drawing, the device consists primarily of a base plate 10 having an outwardly and inwardly turned flange 11 discontinuous at the bottom to define an opening 12 (Fig. 5). This opening accommodates the ends 13 of a spring retaining ring 14 which lies inwardly of the inturned edge a on the lower half of the flange 11.

The ring 14 is interposed between the said edge a of the flange 11 and the bead 15 of a hemispherical mirror 16. A sealing gasket 17 is interposed between the mounting plate 10 and bead 15 to prevent moisture and other foreign matter from entering the space between the mirror and mounting plate.

The mounting plate 10 has a centrally disposed depression 18 which conformably receives a ball 19 affixed to or formed upon the end of a threaded mounting rod 20. A flanged retaining member 21 holds the ball in position in the depression 18 so that the mounting plate 10 may be moved to adjust the mirror 16.

The mounting rod 20 carries nuts 22 by which the device may be attached to and held by a suitable bracket, not shown, of conventional design which is usually attached to the windshield frame of a vehicle to extend outwardly therefrom whereby the driver of a vehicle may observe the approach of cars from behind and view his cargo, in the case of a truck driver.

As the vehicle travels along a highway, turns therein will of course change the position of the vehicle with respect to the rays of the sun which frequently interferes with the driver's vision by reflection in the mirror. To obviate the disadvantage usually attending the adjusting of a mirror of this nature, a visor 23 is pivoted at its sides to each side of the mounting plate flange 11. The pivoting means consists of a circular protuberance 24 (Fig. 2) formed on the lower extremities of an extension 24a of the flange 11 which extends over the upper half of the mirror 16. This circular protuberance is provided with a plurality of annularly radially spaced dimples 25, corresponding with which are similarly formed depressions 26 in a circular plate 27 formed on the visor 23. A rivet 28 connects the plate 27 and protuberance 24 pivotally together while the cooperative function of dimples 25 and depressions 26 is to hold the visor in adjusted positions.

The extension 24a is so spaced from the mirror 16 that the inner edge of visor 23 will, when the latter is raised, repose below the extension as shown in Figures 1 and 5. In this manner, the surface of the mirror will be, in a measure, shielded from dust and further, the arrangement improves the appearance of the device and affords a guide for the visor as the latter is raised.

It is obvious from an examination of Figure 5 that the mirror 16 may be quickly removed from the mounting plate 10 by bringing the protruding ends 13 of the retaining ring 14 together, permitting the same to be removed, after which the mirror may be lifted from the flanged plate.

Manifestly, the construction as shown and described is capable of some modification and such modification as may be construed to fall within the scope and meaning of the appended claims is also considered to be within the spirit and intent of the invention.

What is claimed is:

1. A rear view mirror including a centrally supported mounting plate having an annular, right angle flange whose upper half is of greater width than the lower half to define an arcuate extension, the lower half of said flange being inwardly turned a hemispherical mirror having an annular bead lying within said flange, a retaining ring tensionally held against said bead by the inwardly turned edge of the lower half of said flange, a circular protuberance carried by the lower extremities of the arcuate extension of said flange, a visor having a circular plate on each side thereof, each being centrally pivoted to a corresponding protuberance of said flange, the inner edge of said visor, when in raised position being receivable under the arcuate extension of said flange and means carried jointly by said protuberances and circular plates to hold said visor in adjusted positions.

2. A rear view mirror including a circular mounting plate having an annular flange thereon whose upper portion is of greater width than the lower portions thereof to form an extension, a hemispherical mirror having an annular bead lying within said flange, a split ring held against said bead by the lower portion of said flange whose edge is inwardly turned, a visor whose inner edge is receivable under the upper portion of said flange when in raised position, a protuberance on each side of said flange, a circular plate carried by each side of said visor each being centrally pivoted to a corresponding plate of said flange whereby said visor will be capable of pivotal displacement over said mirror and cooperating means carried jointly by said protuberance and plate for holding said visor in adjusted positions.

JOSEPH R. MILLER.

REFERENCES CITED

The following references are of record in the file of this patent:

UNITED STATES PATENTS

| Number | Name | Date |
|---|---|---|
| 1,774,496 | Oishei | Aug. 26, 1930 |
| 1,848,064 | Oishei | Mar. 1, 1932 |
| 2,121,099 | Putterman | June 21, 1938 |

FOREIGN PATENTS

| Number | Country | Date |
|---|---|---|
| 705,096 | France | Mar. 2, 1931 |